United States Patent [19]

Whalen-Shaw

[11] Patent Number: 5,344,487
[45] Date of Patent: Sep. 6, 1994

[54] LAYERED COMPOSITE PIGMENTS AND METHOD OF MAKING SAME

[76] Inventor: Michael Whalen-Shaw, 7041 Zane Trail Rd., Circleville, Ohio 43113

[21] Appl. No.: 834,468

[22] Filed: Feb. 12, 1992

[51] Int. Cl.$^5$ ............................................. C04B 14/10
[52] U.S. Cl. ............................. 106/416; 106/20 R; 106/437; 106/442; 106/446; 162/162; 162/181.8; 501/141; 501/144; 501/148; 523/400
[58] Field of Search .............. 106/416, 437, 442, 446, 106/20 R; 162/162, 181.8; 501/141, 144, 148; 523/400

[56] References Cited

U.S. PATENT DOCUMENTS

| | | | |
|---|---|---|---|
| 2,176,877 | 10/1939 | Alessandroni | 106/423 |
| 3,453,131 | 7/1969 | Fadner et al. | 106/416 |
| 3,726,700 | 4/1973 | Wildt | 106/437 |
| 3,856,545 | 12/1974 | Ferrigno | 106/462 |
| 3,931,061 | 1/1976 | Kohne, Jr. et al. | 260/2.5 B |
| 4,078,941 | 3/1978 | Bundy et al. | 106/409 |
| 4,117,191 | 9/1978 | Kurrle | 428/330 |
| 4,331,706 | 5/1982 | Kindrick | 427/74 |
| 4,569,920 | 2/1986 | Smith-Johannsen | 501/1 |
| 4,640,716 | 2/1987 | Cleland | 106/161 |
| 4,738,726 | 4/1988 | Pratt et al. | 501/147 |
| 4,767,466 | 8/1988 | Nemeh et al. | 106/487 |
| 4,818,294 | 4/1989 | Raythatha et al. | 106/487 |
| 4,820,554 | 4/1989 | Jones et al. | 427/391 |
| 4,933,387 | 6/1990 | Wason | 524/450 |
| 5,152,835 | 10/1992 | Nemeh | 106/437 |

FOREIGN PATENT DOCUMENTS 905091 5/1991 South Africa .
905093 5/1991 South Africa .

*Primary Examiner*—Karl Group
*Assistant Examiner*—Scott L. Hertzog
*Attorney, Agent, or Firm*—Tarolli, Sundheim & Covell

[57] ABSTRACT

Composite pigments and processes for making the same, useful as partial or total replacement for pigments conventionally employed in paper, paper coatings, paint, ink, and in rubber, are disclosed. The composite pigments comprise one or more synthetic or natural core particles having adsorbed on the surface thereof a polymeric dispersant having a positive or negative charge, and one or more natural or synthetic co-particles having adsorbed on the surface thereof a polymeric dispersant having a positive or negative charge opposite the charge of the core particles. The composite pigments provide improved optical and other properties.

29 Claims, No Drawings

LAYERED COMPOSITE PIGMENTS AND METHOD OF MAKING SAME

BACKGROUND OF THE INVENTION

1. Technical Field

The present invention relates to composite pigments for use in paper coatings. The composite pigments are also useful as paper fillings, and in paint, ink, rubber, and plastic compositions. The present invention also relates to a process for the production of the composite pigments.

2. Description of the Prior Art

Structured or high-bulking pigments have been shown to offer improvements in optical and printing properties when used as a partial or total substitution for clay in paper coatings. The first of the high-bulking pigments introduced into paper coatings was calcined clay. By virtue of its internal pore volume and its disruption of tight parallel clay packing, experienced with standard clay in paper coatings, improved porosity and light scatter was obtained. Calcination of clay, however, produces a product which has high abrasion and which is deleterious to the wires used in the paper making processing. In addition, the use of calcined clay at higher levels in paper coatings may result in either runnability problems or reduced gloss.

More recently, chemically structured kaolin products have been found useful as functional fillers, as titanium dioxide extenders, and as reinforcing agents for paper, paint, rubber and plastics. These chemically structured products include synthetic alkali metal alumino-silicates (U.S. Pat. No. 4,933,387) obtained by hydrothermal modification of kaolin with alkali metal silicates; structured clay obtained by reaction of fine particles of kaolin with an organic silicon compound such as tetramethoxy silane or tetraethoxy silane (U.S. Pat. No. 4,818,294); high bulking kaolin pigments obtained by flocculating kaolin clay with a water-soluble cationic polyelectrolyte (U.S. Pat. Nos. 4,738,726 and 4,767,466); and a bulked kaolin pigment obtained by reacting a low molecular weight polyamine with kaolin (U.S. Pat. No. 4,078,941). Additionally, U.S. Pat. No. 4,640,716 teaches the preparation of a structured pigment formed by the reaction of zirconium ion in the absence of a binder at a pH of 2.8-3.9 with an uncalcined kaolin clay.

These products exhibit low abrasion while providing improvements in optical properties, printability, and as a result of their increased bulk, improved coating coverage over a substrate or lower coating weight. Several of these products, however, exhibit either poor rheology or lack of stability in standard paper coating procedures. A theology appropriate to blade coating speeds in excess of 4,000 feet per minute is desirable. Additionally, structured pigments must survive the shear conditions encountered in coating preparation and use, such as jet cooking, pigment dispersion, and pumping and blade metering.

The above technologies for preparing structured pigments and their use in paper coatings to reduce the level of expensive opacifying pigments such as titanium dioxide, are now conventional practice in the art. Still, pigments with high opacifying powers such as titanium dioxide continue to be used in paper coatings and fillings. The industry continues to search for less expensive pigments to achieve higher opacity at lower cost.

U.S. Pat. No. 3,726,700 discloses the formation of a composite pigment by adhering titanium dioxide particles to calcined clay. The titanium dioxide particles are adhered to the clay by means of hydrous oxides of aluminum, silicon, and titanium. The hydrous oxides are precipitated from a slurry which also contains the clay and titanium dioxide. One problem is that in this process, both clay and titanium dioxide are capable of participating in homoflocculation (aggregation of multiple particles of either the clay or titanium dioxide, e.g., clay-to-clay or titanium dioxide-to-titanium dioxide) in addition to the desired heteroflocculation. The homoflocculation of titanium dioxide in particular can lead to a drop in light scattering efficiency.

U.S. Pat. No. 4,117,191 discloses a composite silicate pigment prepared by precipitating hydrous metal silicate particles onto the planar surfaces of clay particles. It is indicated in the patent that this results in an improvement in optical efficiency. A disadvantage of the process of this patent is that it provides limited flexibility in terms of the types of materials which can be included within the composite pigment.

U.S. Pat. No. 4,331,706 discloses a composite pigment comprising hydrous zinc oxide deposited on the surface of a core particle, followed by calcination. Co-calcination of comminuted materials such as kaolins in the presence of inorganic binders is also disclosed in U.S. Pat. Nos. 3,853,457; 3,864,140; and 3,856,545. All of these processes require the expensive calcination step.

U.S. Pat. No. 4,820,554 discloses an aggregated pigment containing kaolin and up to 12% calcium carbonate. The aggregated pigment is prepared by chemically reacting particulate kaolin with a metal chloride such as a silicon tetrachloride ($SICl_4$). This process has the disadvantage that it requires the use of silicon tetrachloride which is toxic and, and produces hydrogen chloride as a by-product, which must be neutralized. The process also requires an aging time for full development of optical properties.

U.S. Pat. No. 3,453,131 discloses the preparation of composite pigments by the use of fatty acid coupling agents. This type of coupling agent restricts use of the composite pigments in non-aqueous formulations or under dry conditions.

South African Applications Nos. 905093 and 905091 disclose a process for making structured aggregate pigments in which two or more non-identical pigments are joined by a silico-aluminate gel as a de-stabilizing agent. This process also suffers from the probability of homoflocculation of ingredient pigments, and is complex in execution.

U.S. Pat. No. 2,176,877 discloses a process for the manufacture of a composite pigment. A primary pigment is dispersed in an aqueous suspension using a first dispersing agent. Separately, a secondary pigment is dispersed in an aqueous suspension using a second dispersing agent. This second dispersing agent is antipathetic to the first dispersing agent. By antipathetic, it is meant that the second dispersing agent is capable of furnishing ions, on admixture of the primary pigment and secondary pigment, which neutralize the dispersing ions of the first dispersing agent. The dispersing agents are all salts, such as aluminum chloride and sodium silicate. One example given is a coflocculation obtained by admixing a suspension of titanium dioxide, prepared by means of the acidic salt, aluminum chloride, with a suspension of barium sulfate prepared, with the basic substance, sodium silicate. Examples of other acidic dispersants given in the patent are hydrogen sulfide and lead chloride. Following coflocculation, the integrated pigment is then separated from the supernatant liquor, washed, dried, and pulverized.

SUMMARY OF THE INVENTION

The present invention resides in a composite pigment which comprises one or more types of core pigment particles and one or more types of co-pigment particles. The core pigment particles have adsorbed on their surface a polymeric anionic or cationic dispersant, providing the particles with a negative or positive charge. The co-pigment particles have adsorbed on their surface a polymeric anionic or cationic dispersant which provides the particles with a charge which is the opposite of the charge of the core pigment particles. The core pigment particles and co-pigment particles are electrostatically bound together by means of the opposite charges of the polymeric dispersants adsorbed on the surfaces of the pigment particles.

The core pigment particles and co-pigment particles have an average particle size, before composite pigment formation, greater than 0.1 micron.

Preferred core and co-pigment particles are selected from the group consisting of kaolin clay, calcined clay, calcium carbonate, titanium dioxide, calcium sulfate, aluminum trihydrate, silica, talc, zinc oxide, lithopone, satin white, plastic hollow spheres, plastic pigments, and calcium silicate.

The core and co-pigment particles can also be binder particles having an average particle size greater than 0.1 micron.

In an embodiment of the present invention, the composite pigment comprises adjuvant particles incorporated into the composite pigment, selected from the group consisting of water or alkali or acid soluble organic binders having an average particle size less than 0.1 micron, dyes, bactericides, defoamers, anti-foyers, lubricants, optical brighteners and water retention aids.

The present invention also resides in a composite pigment dispersion which comprises a medium and the aforementioned composite pigment dispersed therein.

Preferably, the dispersion comprises a preponderance by volume of the co-pigment particles in the dispersion, over the volume of core particles in the dispersion, the volume of co-pigment particles being effective to provide the dispersion with a net charge which is of the same sign as the charge of the original co-pigment particles.

The present invention further resides in said dispersion further comprising an anionic or cationic dispersant post-added to the dispersion following bonding of the core pigment and co-pigment particles, the post-added dispersant providing, in solution, a charge which is the opposite of the net charge of the dispersion, the post-added dispersant being present in an effective amount to cause a charge reversal of the dispersion. A preferred medium is an aqueous medium.

The present invention also resides in a paper coating, a paper substrate, a paint, a plastic, a rubber, or an ink which contains the aforementioned composite pigment, or composite pigment dispersion.

The present invention further resides in a method for making the composite pigment or composite pigment dispersion.

DESCRIPTION OF PREFERRED EMBODIMENTS

The use of pigments in paper coatings, and as fillers in paper substrates, or in paints, inks, rubber, and plastics is well known. In these applications, the pigments are used to provide optical properties such as gloss, brightness, opacity, and color. The pigment may also provide other properties, such as improving the smoothness of the substrate, or ink hold-out on printing. In the case of coated papers, the traditional function of pigments in the coatings is to fill in irregularities of the paper surface and provide an even and uniformly absorbent surface for printing. Most of the pigmented coatings employed for the coating of paper contain inorganic pigment as the primary ingredient.

The core pigment particles of the present invention can be any of the organic or inorganic pigment particles conventionally employed in the above applications, which are capable of being slurried or dispersed in a fluid medium. Typical inorganic core pigment particles are various grades of clay such as kaolin clay and calcined clay, zinc oxide, talc, lithopone, satin white, aluminum trihydrate, silica, calcium carbonate, calcium sulfate, calcium silicate, barium sulfate, titanium dioxide, and mixtures thereof. Other examples of suitable inorganic core pigment particles will be apparent to those skilled in the art.

Examples of suitable organic particles that can function as core pigment particles are plastic pigments, plastic hollow sphere pigments and polystyrene pigments. These pigments have been used traditionally to reduce the weight of a coating by substitution for inorganic pigments. They can also improve printability and optical properties. Pigments of this type are generally described in U.S. Pat. No. 3,779,800; 3,853,579; 3,949,138; and 3,931,061. The disclosures of these patents are incorporated by reference herein.

The core pigment particles, as they exist in dispersion prior to formation of the composite pigment of the present invention, should have an average particle size greater than 0.1 micron. Below 0.1 micron, the core particles are ineffective in improving opacity. An average particle size of at least about ½ the wave length of visible light (0.2–0.3 micron) is necessary to obtain light scatter. By average particle size of more than 0.1 micron, it is meant that at least 50% of the particles have at least this dimension in the particle longest dimension.

In the case of synthetic pigment particles, the distribution of particle sizes may be in a relatively narrow range. In the case of natural pigment particles, such as kaolin clay, the distribution of particle sizes may be in a relatively broad range, for instance from a colloidal state of about 0.01 micron to a particulate state of about 10 microns.

The core pigment particle can also be a binder particle, as long as the binder particle is insoluble and has an average particle size greater than 0.1 micron.

Examples of binders which can be a core pigment particle are a latex polymer, such as one formed of styrene and butadiene, vinyl acetate, an acrylate ester, a styrene acrylate ester co-polymer, or an acrylate acetate copolymer. The binder can also be a natural binder material such as a soya bean protein, casein, and starch. Starch, casein, and soya bean protein are not normally considered to be pigments, because in normal usage they are heated in the presence of water or alkali until they are solubilized. Starch granules, at room temperature, are relatively insoluble. On heating, the starch granules first swell. If heating is discontinued, no substantial dissolution of the starch granules occurs. The same is true for casein and soya bean protein, but in these instances, alkali is used with heat. Without heat, just swelling takes place.

At the transition point where these granules are swollen but not solubilized, the granules have a definite shape and an average particle size above 0.1 micron. They are thus useful as core particles in the present invention.

A latex can have the necessary particle size, either swollen or non-swollen.

Those skilled in the art will recognize that the above natural and synthetic binder materials can be outside the scope of the present invention. For instance, a cationic starch or a synthetic polymer as disclosed in U.S. Pat. No. 4,738,726 in solution cannot be a core particle because it is both water soluble and less than 0.1 micron in size.

Normally, the common inorganic pigments used in paper are not significantly swollen by water, and their crystalline structure maintains their predetermined individual size and shape. However, the inorganic core pigment particles of the present invention can be hydrophilic, with a strong affinity for water or alkali, and become highly swollen by water, if desired. An example of a swellable inorganic pigment is bentonitic clay. The use of swellable pigments will be disclosed in more detail further in the present specification.

It is understood that the requirement of 0.1 micron average diameter, with regard to swellable particles, particularly binder materials, refers to the diameter after swelling.

The core pigment particles of the present invention can comprise more than one type of particle. For instance, the core pigment particles can comprise a blend of kaolin clay and titanium dioxide, or kaolin clay and calcium carbonate. Other combinations of particles, as core pigment particles, will be apparent to those skilled in the art.

The composite pigment particles of the present invention can comprise, on a weight basis, 1%–99% core pigment particles. Usually, the composite pigment particles of the present invention comprise 1%–35% core pigment particles.

The co-pigment particles of the present invention can be any of the organic or inorganic pigment particles listed above as suitable core pigment particles, having the requisite particle size and insolubility and capable of being slurried or dispersed in a fluid medium; e.g., clay, zinc oxide, talc, lithopone, satin white, aluminum trihydrate, silica, calcium carbonate, calcium sulfate, calcium silicate, barium sulfate, titanium dioxide, plastic hollow spheres, polystyrene pigment, and mixtures thereof. As with the core pigment particles, the co-pigment particles can comprise more than one type of particle, for instance, a blend of pigment particles. One purpose of the co-pigment particles may be to impart certain functional characteristics to a particle dispersion. By way of example, the co-pigment particles may be chosen to enhance the performance of the core particles, by means of the optical properties of the co-pigment particles, such as refractive index, or by means of creating a bulked structure that contains air voids. Thus, the co-pigment particles, in a particular particle dispersion, will normally, but not necessarily, be different from the core pigment particles.

The composite pigment particles of the present invention can comprise, on a weight basis, 1%–99% co-pigment particles. Usually, the composite pigment particles of the present invention comprise 65%–99% by weight co-pigment particles.

Imparting a charge to the core and co-pigment particles is accomplished, in the present invention, by the adsorption of an ionic polymeric dispersant on the surface of the particles. The dispersant can be either anionic or cationic. A solution or dispersion of the desired polymeric dispersant is first prepared. The pigment particles either co- or core are then added, with mixing, to the solution or dispersion. Some pigments, such as talc, may require prior wetting, with a wetting agent, before adding the pigment to the solution or dispersion. The core pigment particle dispersion and the co-pigment particle dispersion are separately formed. That is, the core pigment particle dispersion is formed, with either an anionic or cationic dispersant, and a co-pigment particle dispersion is separately formed, with a dispersant which imparts to the particle a charge of opposite sign to that of the core particle.

In making either the core pigment particle dispersion or the co-pigment particle dispersion, an aqueous medium usually is employed. The polymeric dispersants are those that ionize in the medium. The dispersants are also those that form, on ionization, large anions or cations that are strongly adsorbed onto the surface of the pigments. As a result of this adsorption, the particles receive an electrostatic charge equal to the charge of the adsorbed ions. The ions are localized at the surface of the particles. The magnitude of the charge on a particle depends upon the number of ions adsorbed onto each molecule, and upon the charge of each ion.

The pigment particles in the respective core and co-particle or dispersions are in a stable suspension, stabilized by the adsorbed dispersant ions. The adsorbed ions establish a layer of counter-ions of opposite charge around each particle. The counter-ions are those ions left in the dispersion following ionization of the polymers and particle ion adsorption. The layer of counter-ions do not attach themselves to adsorbed ions due to the factors that cause the polymers to ionize in the first place. When one particle approaches another, as though to flocculate, the diffuse layer of counter-ions on one particle begins to merge with the diffuse layer of counter-ions on the other particle. Since the two layers of counter-ions are similarly charged, the layers repel each other, thus maintaining the particles in a dispersed, stable condition in the dispersion.

Because the core particles and the co-particles are slurried with the aid of polymeric dispersants, no homoflocculation of the core particles or the co-particles occurs.

Once the core and co-particle dispersions are made, the two dispersions are then combined. The two dispersions are combined by adding one to the other. Preferably, the addition of one to the other is carried out slowly with shear mixing. This dictates in part which particle is the core particle and which particle is the co-particle. The particles from the giving dispersion (the dispersion being added) see a superabundance of particles from the receiving dispersion. Thus, multiple particles from the receiving dispersion flow to each particle from the giving dispersion, to satisfy the charges on the particle from the giving dispersion. The particles from the giving dispersion thus become the core particles and the particles from the receiving dispersion thus become the co-particles, in a layered structure on the core particles.

Instead of adding the core particle dispersion slowly to the co-particle dispersion, with shear mixing, the two dispersions can be randomly admixed, for instance, rapidly combined, with shear mixing. Instead of obtaining the above layered structure, a more chain-like structure is thus obtained, with a core particle bonded to two co-particles, each co-particle being then bonded to a core particle.

In either process, a critical aspect of the present invention is combining the dispersions along with shear mixing. This prevents the core particles and the co-particles from bonding in the form of large aggregates. The use of polymeric dispersants permits effective shear mixing to prevent the formation of large aggregates. The electrostatic bonds formed by the polymeric dispersants are sufficiently weak that long chains or large aggregates of particles can be broken by shear mixing. This avoids the need for particle reduction, for instance by grinding, after the composite particles are dried.

At the same time, the strength of the electrostatic bonds, formed by the polymeric dispersants, in combination with Van der Waals forces, are sufficient to keep the composite particles intact, even in the presence of the conventional shear forces experienced in paper making or coating processes, or in formulation and use processes conventionally associated with plastics, rubbers, paints, and inks.

The polymeric dispersants of the present invention are generally of low molecular weight, in the range of about 2,000 to about 100,000. Examples of polymeric dispersants capable of forming large polyanions, when ionized, are well known. A preferred such polymeric dispersant is a water-soluble vinyl polymer, an alkali metal or ammonium salt thereof, or an alkali metal or ammonium salt of polysilicic acid. Specific examples are poly (acrylic) acids, poly (methacrylic) acids, a substituted poly (acrylic acid), a substituted poly (methacrylic acid), or an alkali metal or an ammonium salt of any of these acids. One commercially available anionic dispersing agent is sodium polyacrylate.

It is also possible to purchase pigment particles having an anionic polymeric dispersant adsorbed on the surface of the particles. One such pigment particle is kaolin clay marketed by the Georgia Kaolin Company under the trademark "PREMIER" The "PREMIER" kaolin clay is available as a 70% by weight aqueous suspension of clay dispersed with sodium polyacrylate. Another anionic pigment particle which is commercially available is titanium dioxide marketed by E.I. Dupont de Nemours under the trademark "RPS". The titanium dioxide is dispersed in water using a blend of sodium polyacrylate and an alkanol amine as the dispersing agent.

Examples of suitable cationic polymeric dispersants useful in the present invention are disclosed in U.S. Pat. No. 5,006,574. One useful water-soluble cationic polymeric material is a diallyl quaternary ammonium polymer salt. This cationic polymer is characterized by a high density of positive charge. Preferably, the polymer does not have negative groups such as carboxyl or carbonyl groups.

U.S. Pat. No. 5,006,574 also discloses other quaternary ammonium cationic polymers obtained by co-polymerizing an aliphatic secondary amine with epichlorohydrin. Still other water-soluble cationic polyelectrolytes are poly (quaternary ammonium) polyester salts that contain quaternary nitrogen in a polymeric backbone and are chain extended by the groups. They are prepared from water-soluble poly (-quaternary ammonium salts) containing pendant hydroxyl groups and bi-functionally reactive chain extending agents. Such polyelectrolytes are prepared by treating $N,N,N^{(1)},N^{(1)}$tetraalkylhydroxyalkylene diamine and an organic dihalide such as dihydroalkane or dihaloether with an epoxy haloalkane. Other water-soluble cationic polyelectrolytes are polyamines.

U.S. Pat. No. 5,006,574 is specifically directed to the preparation of a stable aqueous slurry of positively charged particles of calcined kaolin clay. The disclosure of U.S. Pat. No. 5,006,574 is incorporated by reference herein.

U.S. Pat. No. 4,874,466 also discloses the adsorption of a cationic water-soluble polymer onto a pigment particle, from an aqueous dispersion. The polisher comprises at least 50 weight percent of repeating units consisting of a quaternary ammonium salt moiety and 2–10 carbon atoms, wherein the carbons form alkyl or aryl moieties, or combinations of alkyl and aryl moieties which are substituted with hydroxy, amine or halide, and polyaluminum chloride and mixtures thereof. The positively charged pigment disclosed in U.S. Pat. No. 5,006,574 is titanium dioxide. The disclosure of U.S. Pat. No. 4,874,466 is also incorporated by reference herein.

Cationic polymeric dispersing agents are also commercially available, for instance a cationic oligomer marketed by Calgon Corp. under the trademark "CALGON 261". Another is one marketed by Nalco Chemical Co. under the trademark "NALCO 7607".

The amount of ionic polymeric dispersant employed in the present invention is usually a small amount, in the range of about 0.01–2.5 weight percent based on the weight of the pigment. A preferred level of addition is about 0.05–0.5 w/w percent based on pigment.

It may be desirable to incorporate into the composite pigment particles of the present invention an adjuvant particle. The adjuvant particle can be bound to either the core pigment particle or the co-pigment particle. They are bound in the same way as the core and co-pigment particles are bound together, by dispersing the adjuvant particles with an ionic dispersant capable of imparting the desired charge to the adjuvant particles.

An adjuvant particle is one that is not normally considered a pigment particle. Its function is to add a functionality which supplements those provided by the core pigment particle and co-pigment particle, for instance, added strength, or the ability to bind to loose pigment in the coating. Examples of adjuvant particles within the scope of the present invention are organic binders which are water, acid, or alkali soluble, dyes, bactericides, defoamers, anti-roamers, lubricants, optical brighteners, and water retention aids.

It is recognized that truly water soluble binders have an extremely small particle size, equivalent to the dimension of a single molecule, and therefore are not normally considered a particle. Such binders can be employed as adjuvant particles in the present invention. Examples of binders which approach the definition of being truly water soluble are proteins, caseins, acrylate acid polymers and co-polymers, derivitized starch, either anionic, non-ionic or cationic and acrylamide and its co-polymers.

The core or co-pigment particles of the present invention may contain the adjuvant particles, either bound to the core pigment particles or to the co-pigment particles, before the two pigment particle suspensions are mixed together, or may be post-added to the composite pigment suspension, or dried particles of the composite pigment.

The functions of the adjuvant particles, particularly in paper substrates and coatings, are well known. One purpose of an adjuvant binder particle on a core pigment particle may be to function as a binding agent to create a pre-bound pigment capable of resisting migration in a coating. A water soluble binder that is located on the surface of a co-particle may also function as a contact point for the deposition of further shell material.

Above, it was mentioned that the core pigment particle of the present invention can be a swellable pigment. Examples of swellable pigments are bentonitic clay, natural or synthetic alkali or water swellable materials such as one marketed by Dow Chemical Co. under the trademark "DOW 650", casein, starch, acrylamide starch graft copolymers, and soya bean protein. The swelling of bentonitic clay is disclosed, by way of example, in U.S. Pat. No. 3,856,545. This disclosure is incorporated by reference herein. The swelling of a plastic pigment is disclosed in U.S. Pat. No. 3,931,061. A Dow SD-18 latex is used. An aqueous emulsion of the latex at 40% solids is treated with an ethylacetate swelling agent. The swollen particles are set, and when used in a paper coating provide voids or air-solid interfaces which increase scattering coefficients. The disclosure of U.S. Pat. No. 3,931,061 is incorporated by reference herein.

Such swollen particles can be used as the core particles in the present invention. A suspension of composite pigment comprising swollen core particles is composed of core material mostly of water. When the thus formed composite pigment is incorporated into a paper coating, in an amount of 1%–70% (based on the dry weight of the coating), and the coating is applied to a paper substrate, and dried, the core material on drying shrinks, due to evaporation of water, leaving a relatively hollow interior. The difference in refractive index between the co-pigment particles and the air voids of the interior provides substantial improvement in light scatter.

It may be desirable to reverse the charge of the composite pigment dispersion which is obtained. For instance, in the preparation of a paper coating, in which all species traditionally have a neutral or anionic charge, it may be desirable to achieve an anionic charge on the surface of the composite pigment particles added to the paper coating, in order to assure compatibility. In the event the composite dispersion has insufficient anionicity, this can be accomplished by post-adding an anionic dispersing agent to the dispersion of composite pigment particles. One example of a suitable such anionic dispersing agent is sodium polyacrylate. Such polymeric dispersing agent is post-added to the composite pigment dispersion in an amount effective to assure sufficient anionicity of the dispersion.

The following Examples illustrate the present invention.

Example 1

This Example illustrates the preparation of a composite pigment in accordance with the present invention, and advantages of the same.

One milliliter of a cationizing oligomer dispersant marketed by Calgon Corporation under the trademark "CALGON 261" is added to 100 milliliters of 50 weight percent titanium dioxide to give, after mixing, a fluid suspension.

Separately, 100 milliliters of a 70% suspension of kaolin clay, marketed by the Georgia Kaolin Company under the trademark "PREMIER" is diluted with water to a 50 weight percent suspension. The "PREMIER" kaolin clay is dispersed with sodium polyacrylate, and thus has an anionic net charge. The clay has a brightness of 86%–88%, and an average particle size under two microns.

The cationic titanium dioxide dispersion (100 milliliters of 50% solids) is slowly added, with mixing with a Black & Decker kitchen blender, to the 100 milliliters of the 50% kaolin clay suspension.

The volume ratio of the titanium dioxide particles to the kaolin clay particles, in the final test suspension of the present invention, is about 0.6. This is due to the difference in specific gravity between the titanium dioxide and kaolin clay. Although the weight of the titanium dioxide in the final suspension is equal to the weight of kaolin clay, the specific gravity of the kaolin clay is less than the specific gravity of the titanium dioxide, giving the volume ratio of 0.6.

Because of this volume ratio, and the addition of the titanium dioxide particle suspension to the kaolin clay particle suspension, the titanium dioxide particles become the core pigment particles and the kaolin clay particles become the co-pigment particles. The excess, by volume, of the kaolin clay pigment particles maintains the anionic nature of the suspension of composite pigment particles.

A control suspension is also prepared. The control suspension is a mixture of 100 milliliters of the titanium dioxide suspension, without the "CALGON 261" dispersant and 100 milliliters of the kaolin clay suspension. The control suspension has a significantly lower viscosity than the test suspension of composite pigment. After three days, the suspension of the present invention exhibits no settling, whereas the control suspension does settle.

Both the composite test suspension of the present invention and the control suspension are coated onto a smooth black paper, with a straight edge, and dried, following the procedure disclosed in "Proceedings of Tappi Conference", Volume 143, 1981, Lee. The composite pigment of the present invention provides a much whiter coating on block than the control pigment due to an improved scattering coefficient, and to a better pigment hold-out. These results are obtained despite the exposure, in a blender, to high shear during mixing. This demonstrates the shear stability of the composite pigment of the present invention.

The particle size of the composite pigments of the present invention, on drying, are effective for addition of the composite pigment to a paper coating formulation. No size reduction, for instance by grinding, is required.

Example 2

This Example illustrates that more than one type of cationic core particle or anionic particle may be present.

A cationic calcined clay slurry is prepared according to the procedure of U.S. Pat. No. 5,006,574. The slurry is then mixed with the cationic titanium dioxide suspension of Example 1, and then the combined suspensions are added to the anionically dispersed kaolin clay of Example 1, using the proportions set forth in Example 1. The core particle is a blend of the calcined clay and titanium dioxide. The composite pigment suspension has a net negative charge, due to the greater volume of the anionic kaolin clay particles in the suspension.

Example 3

This Example illustrates the versatility of the present invention and ability to match the final charge of the composite pigment with an intended application.

A cationic calcined kaolin clay suspension is prepared following the procedure of U.S. Pat. No. 5,006,574. An anionic titanium dioxide suspension (Dupont RPS) is combined with the cationic calcined clay suspension by adding the clay suspension to the anionic titanium dioxide suspension. The anionic titanium dioxide suspension is dispersed with a blend of sodium polyacrylate and an alkanol amine.

The relative proportions of the respective suspensions are such as to provide a preponderance of titanium dioxide particles in the combined suspension. The combined suspension thus has a net negative charge. The core particles are the calcined clay. The co-pigment particles are the titanium dioxide.

U.S. Pat. Nos. 5,006,574 and 4,874,466 disclose that cationic calcined clay and cationic titanium dioxide offer improved retention in paper making systems. The above composite dispersion is readily cationized by post-treating the dispersion with a cationic dispersing agent, for instance one disclosed in U.S. Pat. No. 5,006,574 or U.S. Pat. No. 4,874,466.

Advantages of the present invention should be apparent to those skilled in the art. Primarily, the procedures of the present invention provide optimum simplicity. Simple mixing of ingredients is required. Homoflocculation of ingredients is avoided by dispersing the ingredients with polymeric dispersing agents. The present invention provides a means for controlled building of composite pigment structures. It allows complete flexibility with respect to the choice of ingredients constituting the composite pigment. The process of the present invention is free from noxious chemicals. If desired, the composite pigments of the present invention can comprise charged binder particles. This per, nits additional ingredients to be bound into the composite structure by the binder. The process of the present invention is characterized by a low energy cost involving only mixing of ingredients. The present invention provides a means for achieving improved light scattering coefficients. Composite pigments prepared according to the present invention have optimum shear stability. The present invention can be practiced on site, at a user's plant.

Example 4

An anionic kaolin clay co-particle suspension is prepared following the procedure of Example 1. A cationic calcium carbonate core particle suspension is separately prepared following the procedure of U.S. Pat. No. 5,006,574. The procedure is the same as in the '574 patent except that the pigment particle which is cationically charged is calcium carbonate rather than calcined clay. The two suspensions are blended in proportions to provide a preponderance of the anionic kaolin clay particles. The calcium carbonate suspension is added slowly to the kaolin clay suspension as in Example 1. The combined suspension has a net negative (anionic) charge, in which the calcium carbonate particles are the core particles.

The suspension is added to a paper coating composition in an effective amount to provide a 60% solids dispersion. The coating composition is applied to a paper following conventional coating procedures.

A control coated paper is also prepared. The control coated paper comprises a coating composition containing the same amounts of kaolin clay and calcium carbonate, except that the two pigments are not ionically bound together. The kaolin clay and calcium carbonate are simply mixed into the coating composition.

The publication "Investigation of Factors Related to Backtrap Mottle in Coated Papers using Electron Probe Micro Analysis" (Proceedings of the 1991 Tappi Coating Conference, page 401) reports on the reason for the printing problem known as backtrap mottle. The reason is reported to be the non-uniform distribution of calcium carbonate on the surface of the coated paper due to the migration of the calcium carbonate during coating application and drying. The composite pigment according to the instant invention, in which the calcium carbonate is permanently deposited on the surface of the kaolin clay, prohibits flocculation of the calcium carbonate, and migration of the calcium carbonate in the paper coating during coating application and drying. This leads to a uniform distribution of this pigment in the coating and the opportunity for uniform printing.

The same results would have been achieved had the core particle been the calcium carbonate and the co-particle the kaolin clay. In such instance, the composite structure of the pigment would prevent migration of calcium carbonate and provide for uniform distribution of the calcium carbonate in the paper coating.

Example 5

This Example illustrates the use of an adjuvant binder in the composite pigment of the present invention.

An anionic kaolin clay particle ($CaCO_3$) suspension is prepared as in Example 4 except that prior to addition of cationic $CaCO_3$, 2% carboxylated alkali solubilized soya protein (adjuvant alkali soluble binder) based on kaolin clay is added and mixed with the kaolin clay dispersion. This material is known in the trade as Procote 400 and is obtainable from Protein Technologies International, St. Louis, Mo. Alternatively, 2% Adcote, an alkali solubilized ethylene acrylic acid copolymer, obtainable from Morton Thiokol, can be added. Again, alternatively, 1% of water solubilized polyvinyl alcohol, obtainable from Dupont Co., can be added. The anionic suspension of kaolin clay (core particles) and adjuvant binder is then added to the suspension of cationic $CaCO_3$ co-particles with mixing in the ratio of 40/60 by volume. Following mixing in a blender a suspension of prebound layered composite pigment is obtained which has improved strength and eliminates migration of the binder used.

The migration of adhesives during the application, metering, and drying of paper coatings is a well known phenomena that not only leads to uneven ink density in printing but also may result in localized areas of zero or low binder concentration within the thickness of a coating. This leads to wet pick during printing. It is further well known that the addition of traditional high bulking pigments to paper coatings increases the binder demand of the coating in order to have an acceptable strength during printing. This may be due to either lack of strength within a traditional high bulking pigment or due to its disruption of tight parallel plate packing causing increased porosity and the consequent loss of binder efficiency due to void filling by the binder.

In either case, the composite pigment of the present invention, containing a binder, prevents binder migration in a paper coating process. This is due to the shear stability and strength of the composite pigment aggregate in the paper coating. At the same time, the binder particles are capable of developing external bonding with loose pigments in a coating formulation during drying and calendaring of the coated paper, improving the overall integrity of the coating.

From the above description of the present invention, those skilled in the art will perceive improvements, changes and modifications. Such improvements, changes and modifications within the skill of the art are intended to be covered by the appended claims.

What is claimed is:

1. A composite pigment comprising one or more types of core pigment particles and one or more types of co-pigment particles prepared by mixing core pigment particles with co-pigment particles, the core pigment particles prior to mixing comprising adsorbed on their surface a dispersing agent consisting essentially of a cationic polyelectrolyte dispersant or an anionic polyelectrolyte dispersant and the co-pigment particles prior to mixing comprising adsorbed on their surface of dispersing agent consisting essentially of an anionic polyelectrolyte dispersant or a cationic polyelectrolyte dispersant which is opposite in charge to the dispersant on the core pigment particles and which provides the co-pigment particles with a charge opposite the charge of the core pigment particles, the co-pigment particles in the composite pigment being electrostatically bound to the core pigment particles, the core pigment particles and the co-pigment particles having an average particle size greater than 0.1 micron.

2. The composite pigment of claim 1 in which said core and co-pigment particles are selected from the group consisting of kaolin clays, calcined clay, calcium carbonate, titanium dioxide, calcium sulfate, aluminum trihydrate, silica, talc, zinc oxide, lithopone, satin white, plastic hollow spheres, plastic pigments, calcium silicate, and synthetic or natural binders.

3. The composite pigment of claim 2 comprising adjuvant particles incorporated into the composite pigment, said adjuvant particles being water or alkali or acid soluble binders having a particle size less than 0.1 micron.

4. The composite pigment of claim 2 comprising adjuvant particles incorporated into the composite pigment wherein said adjuvant particles are selected from the group consisting of: dyes, bactericides, defoamers, antifoamers, lubricants, optical brighteners and water retention aids.

5. The composite pigment of claim 1 comprising kaolin clay having sodium polyacrylate adsorbed on the surface thereof as either a core pigment particle or co-pigment particle, or both.

6. The composite pigment of claim 5 wherein the core pigment particle is a swollen pigment particle.

7. A coating composition comprising the composite pigment of claim 1.

8. A paper composition comprising the composite pigment of claim 1.

9. A plastic comprising the composite pigment of claim 1.

10. A rubber comprising the composite pigment of claim 1.

11. An ink comprising the composite pigment of claim 1.

12. A composite pigment dispersion comprising one or more types of core pigment particles and one or more types of co-pigment particles prepared by mixing core pigment particles with co-pigment particles, the core pigment particles prior to mixing comprising adsorbed on their surface a dispersing agent consisting essentially of a cationic polyelectrolyte dispersant or an anionic polyelectrolyte dispersant and the co-pigment particles prior to mixing comprising adsorbed on their surface a dispersing agent consisting essentially of an anionic polyelectrolyte dispersant or a cationic polyelectrolyte dispersant which is opposite in charge to the dispersant on the core pigment particles and which provides the co-pigment particles with a charge opposite the charge of the core pigment particles, the co-pigment particles in the composite pigment dispersion being electrostatically bound to the core pigment particles, the core pigment particles and the co-pigment particles having an average particle size greater than 0.1 micron.

13. The dispersion of claim 12 comprising an aqueous medium.

14. The dispersion of claim 12 prepared by adding a dispersion of the core pigment particles, with shear mixing, slowly to a dispersion of the co-pigment particles.

15. The dispersion of claim 14 comprising a volumetric excess of co-pigment particles, said dispersion having a net charge which is of the same sign as the co-pigment particles.

16. The dispersion of claim 14 comprising a cationic or anionic dispersant post-added to the dispersion, after admixing the core particle dispersion and the co-particle dispersion, in an amount effective to establish the net charge of the dispersion.

17. The dispersion of claim 16 comprising 0.1% to 2% of said dispersant based on pigment weight.

18. The dispersion of claim 12 in which the core and co-pigment particles are selected from the group consisting of kaolin clay, calcined clay, calcium carbonate, titanium dioxide, calcium sulfate, aluminum trihydrate, silica, talc, zinc oxide, lithopone, satin white, plastic hollow spheres, plastic pigments, calcium silicate, and synthetic or natural binders.

19. The dispersion of claim 12 in which the core pigment particle is a swollen pigment particle.

20. The dispersion of claim 12 comprising adjuvant particles incorporated into the composite pigment, said adjuvant particles being water or alkali or acid soluble binders having a particle size less than 0.1 micron.

21. The dispersion of claim 12 comprising adjuvant particles incorporated into the composite pigment wherein said adjuvant particles are selected from the group consisting of dyes, bactericides, defoamers, antifoamers, lubricants, optical brighteners, and water retention aids.

22. A coating composition comprising the dispersion of claim 12.

23. A paper composition comprising matrix forming components and the dispersion of claim 12 as a filler.

24. A method of preparing composite pigments comprising the steps of:
   obtaining a suspension of core pigment particles comprising adsorbed on the surface thereof a dispersing agent consisting essentially of a cationic polyelectrolyte dispersant or an anionic polyelectrolyte dispersant;

obtaining a suspension of co-pigment particles comprising adsorbed on the surface thereof a dispersing agent consisting essentially of an anionic polyelectrolyte dispersant or a cationic polyelectrolyte dispersant which is opposite in charge to the dispersant on the core pigment particles and which provides said co-pigment particles with a charge opposite the charge of the core pigment particles; and admixing said suspensions wherein the co-pigment particles electrostatically bind to the core pigment particles;

said core pigment particles and said co-pigment particles having an average particle size greater than 0.1 micron.

25. The method of claim 24 wherein the suspension of the core pigment particles is slowly added to the suspension of co-pigment particles with shear admixing wherein there is present in the admixture throughout the addition an abundance of co-pigment particles, the co-pigment particles defining a layered structure on the core pigment particles.

26. The method of claim 24 including the step of post-adding to the admixture a dispersant having an anionic or cationic charge in an amount effective to establish in the admixture a net charge of the same sign as said post-added dispersant.

27. The method of claim 24 wherein at least one of said core pigment or co-pigment suspension is prepared by the steps of:
   (a) obtaining said core pigment or said co-pigment;
   (b) preparing an aqueous solution or suspension of an anionic or cationic polymeric water soluble dispersant;
   (c) adding said pigment of paragraph (a) to said solution or suspension with mixing whereby said polymeric dispersant is adsorbed onto the surface of said pigment, said polymeric dispersant being present in said solution in an amount in the range of 0.1% to 2% based on the weight of said pigment.

28. A composite pigment dispersion prepared by the method of claim 24.

29. A composite pigment prepared by the method of claim 24, said method further including the step of drying the composite pigment.

* * * * *